J. D. RAMSEY.
FILTER.
APPLICATION FILED AUG. 28, 1914.
1,294,164.
Patented Feb. 11, 1919.
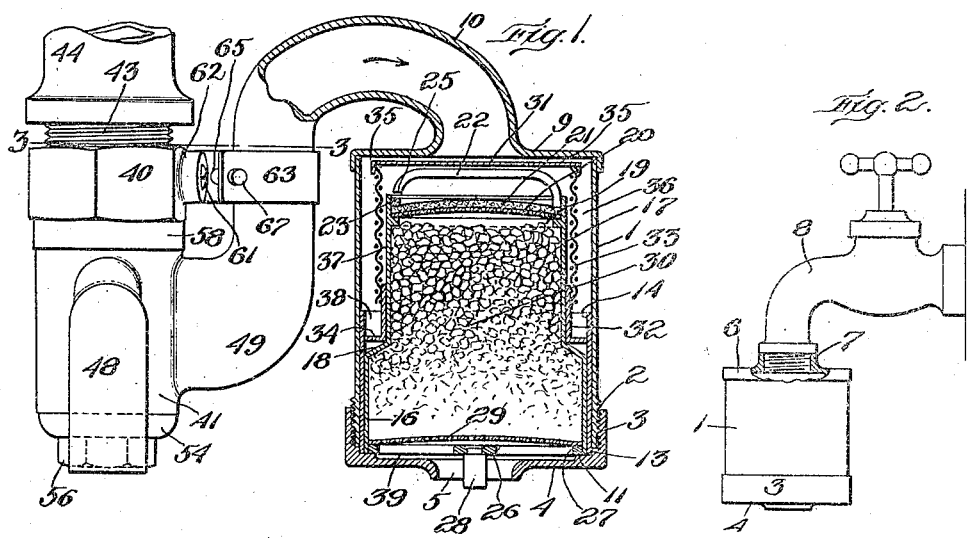
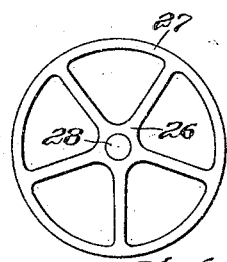
Fig. 6.
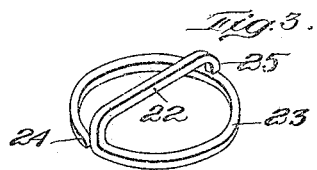
Fig. 3.
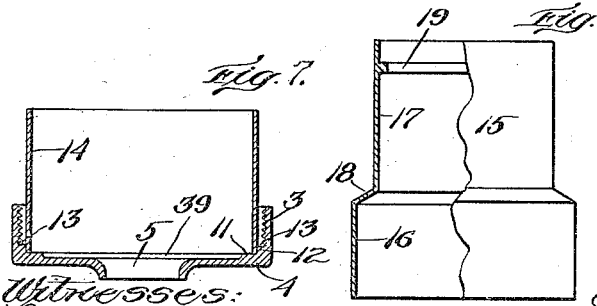
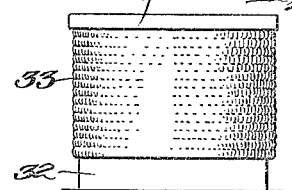
Witnesses:
Edward Maxwell
James R. Hodder
Inventor:
Joseph D. Ramsey,
by Geo. W. Maxwell,
atty.

UNITED STATES PATENT OFFICE.

JOSEPH D. RAMSEY, OF BOSTON, MASSACHUSETTS.

FILTER.

1,294,164. Specification of Letters Patent. Patented Feb. 11, 1919.

Application filed August 28, 1914. Serial No. 859,126.

*To all whom it may concern:*

Be it known that I, JOSEPH D. RAMSEY, a citizen of the United States, and resident of Boston, county of Suffolk, State of Massachusetts, have invented an Improvement in Filters, of which the following description, in connection with the accompanying drawings, is a specification, like letters on the drawings representing like parts.

My present invention is an improvement in water filtering apparatus, and includes as an important feature, a novel form of valve mechanism. While my present improved filtering apparatus is applicable to an ordinary water faucet, I prefer to utilize the same in combination with a special and novel form of faucet and valve, said valve having additional water purifying or filtering features, as well as affording the combination of means to conduct the water through the filter or through a free open nozzle or to shut off the flow of water. A further important feature consists in the arrangement whereby the water may be conducted either through the free flowing nozzle or through the filter, simultaneously with the operation of the water valve to turn on the same and permit the water to flow.

In my development of the art of water purification, as shown for example by my prior Patents Nos. 1,020,053, and 1,084,030, I have explained and claimed my improvements in water filters, utilizing means to filter or strain the water so that some of the sediment therein will be prevented from reaching the charcoal or similar filtering material, and clogging up the same. In my present filter I have still further improved this important feature by providing a plurality of means to aid in the purification of the stream of water before it reaches the mass of charcoal for final purification, thus enabling the charcoal to be maintained in its best condition, indefinitely. Furthermore, I have discovered that by decreasing the flow and regulating the pressure of the water before it reaches the charcoal or filtering material, a much better result is obtained and the sediment and other impurities in the water may be collected and all coating of the charcoal eliminated. This feature is also important because the packing of the charcoal or filtering material should be differently arranged for high pressure and for low pressure of water, but in my present filter and valve invention, by decreasing the flow and regulating the pressure, the water is always conducted to the filtering charcoal in a properly regulated flow for the best purifying action of the charcoal thereon. By decreasing the flow of water, the sediment carried thereby naturally falls to the bottom of the pocket-like recesses, which recesses are arranged out of the line of flow of the water and can be easily cleaned. I prefer to use the decreased flow of water and sediment collecting pockets for the first filtering means, then a plurality of strainers combined with a second lake-like recess and sediment collecting pockets, and then a textile strainer through which the water must pass to the final purifying, deodorizing and filtering action through the mass of charcoal.

In utilizing the present improved filter with my novel form of valve, I further provide means to clear out the sediment which may be deposited in some of the purifying devices in advance of the charcoal, without removing the filter and by simply turning the valve to permit a free flow of water, my improved valve combining both filtering and free flowing mechanism.

A still further feature of the combined filtering and free flowing valve is that a slight movement of either nozzle turns the valve to permit the water to flow on or be shut off, and no separate valve is necessary.

Other features of the invention consist in adjustable means to determine the position when the filtering valve is open to give the desired flow and pressure of water therethrough; to secure both free flowing and filtering nozzles simultaneously to a water pipe; to provide suitable clearance under the filter; and to facilitate the assembling and cleaning of the filtering mechanism, permitting cleaning without removing or disturbing the charcoal.

Other features of the invention, novel combinations of parts, and details of construction will be hereinafter more fully pointed out and claimed.

Referring to the drawings,

Figure 1 is a side view, partly in cross section, of my combined filtering and free flowing faucet and the improved filter attached thereto;

Fig. 2 is a view, partly in cross section, of the filter alone attached to an ordinary water faucet;

Fig. 3 is a detail perspective view of the spring retainer and handle in the filter mechanism;

Figs. 4 and 5 are still further detailed views of the filter screen and charcoal container;

Fig. 6 is a plan view of the arbor to support the filtering charcoal; and

Fig. 7 is a view in cross section of the bottom portion of the filter holder.

I will first describe my improved water filter, which is of the general type described in my said prior Patent 1,020,053, but with important improvements therein, which filter may be made separately and applied to any ordinary water faucet or valve, as illustrated in Fig. 2, or may be utilized in combination with my novel form of valve, as shown in Fig. 1.

The filter comprises the cylindrical metal casing 1, having its lower portion threaded at 2, and adapted to be screwed on to a correspondingly threaded flange 3 of the bottom piece, base or cap 4, having an opening 5 through which the filtered water passes. To the top of the container 1 is fitted a top 6, as shown in Fig. 2, with a threaded flange 7 adapted to be attached to a faucet 8, or the casing 1 may be secured to a top 9, shown in Fig. 1, either integral with or attached to a pipe 10 to conduct water thereto. The base 4 is formed (see Fig. 12) with an annular shoulder 11 and a vertical face 12 and a second annular shoulder 13, the latter adjacent to the threaded interior of the flange 3. Fitted on the shoulder 11 and secured firmly by soldering or otherwise against the face 12, is a cylindrical guard ring 14 extending upwardly and fitting snugly against the casing 1, when the latter is threaded on to the cap 4. The guard ring 14 extends upwardly substantially midway of the casing 1 approximately in the position as illustrated in Fig. 1. The charcoal cup or container 15 (see Fig. 10) is an open cylindrical barrel having its lower diameter 16 adapted to fit snugly within the inner walls of the guard 14 and with its upper portion 17 of a less diameter, so as to be spaced away from the inner walls of the guard 14, these two differing diameters being integrally connected by the intermediate portion 18.

Around the inner wall of the portion 17 near its top is formed a flange 19 adapted to receive a wire screen 20 which supports a felt filtering cloth 21, the latter being held in place by the spring clamp 22. The clamp 22 comprises a ring portion 23 of slightly greater diameter than the interior of the wall 17 of the charcoal container, so as to be held therein when snapped into place and to hold the edge of the felt 21 and wire screen 20 snugly into engagement with the flange 19 as clearly shown in Fig. 1. This clamp 22 has its ends free, as indicated at 24, 25 Fig. 8, so that the spring feature is present in both the handle and the ring, and a simple and economical construction is provided. The lower end of the charcoal container 15 is closed with an arbor 26 having its periphery 27 of suitable diameter to fit within the wall 16 and to rest on the face 11 of the cap 4, said face being of sufficient width to receive both the guard 14 which is permanently secured thereto, and the edge of the lower wall 16 of the charcoal container and ring 27 of the arbor, as also illustrated in Fig. 1. I prefer to form the arbor 26 with a central stem or projection 28 which aids in centering the flow of water through the opening 5 in the cap 4 and also enables the arbor to be removed from and fitted in the portion 16 of the container. A wire screen 29 is fitted within the wall 16 of the container and rests upon the rim 27 of the arbor, thus holding the charcoal 30 or other filtering material within the container 15. To fit over the top of the container 15 and to divert the water flow from directly impinging against the charcoal container screen as well as to provide an additional filter screen and a receptacle to collect and to remove sediment carried by the water, I provide a cup shaped member consisting of a solid top 31, a rim 32 and an intermediate connecting screen 33. This screen member is of appropriate diameter to fit over the upper portion 17 of the charcoal container and the rim 32 slides thereon, said rim 32 having a horizontally extending flange 34 adapted to contact with or rest upon the wall 18 of the charcoal container. In this position the top 31 presents a solid diffusing plate to the stream of water coming into the filter from the direction of the arrow in Fig. 1, and diverts it through the annular space 35 down either side of the filter into the space 36, where the water accumulates and flows through the metal screen 33. This screen is secured to the outer surface of the rim 32, thus leaving a space equal to the thickness of the rim between the interior of the screen 33 and the adjacent outer wall 17 of the charcoal container, said space being indicated at 37 in Fig. 1. The water will rise in the spaces 36 and 37 until reaching the top rim of the wall 17 of the container when it will flow thereover on all sides through the felt 21, supporting screen 20 and charcoal 30, down through the bottom screen 29 and out through the apertures in the arbor 26 and the opening 5. This flange 34 is of appropriate extent to accurately and snugly fit within the inner diameter of the guard ring 14, which ring extends upwardly a sufficient distance overlapping the rim 32 and providing an annular recess or pocket 38. This pocket will catch any sediment in the water as it flows into the space 36, the flow of water being here checked and held, so that any heavy articles, impurities, sediment and the like which may have found their way thus far, will settle to the bottom of the recess 38 and pile up therein on the flange 34, which flange forms the bottom of the recess. When the filter is removed for cleaning, and the cap 4 is unscrewed, the entire filtering apparatus is easily removed and the screen member lifted out, its flange 34 removing the sediment accumulated in the recess 38 and thus quickly cleaning the same. I prefer to form the cap 4 with an annular recess 39 to facilitate the flow of water through the entire diameter of the charcoal container and through the interstices in the arbor 26, so that the spokes or bars of the arbor will not act in any way to divert the water in its egress from the filter, although the form of the arbor itself gives sufficient clearance for water flow as above described.

My perfected filter thus comprises means to protect the charcoal or other filtering material from the direct impinging pressure of the force of water, thereby preventing the charcoal particles from becoming compacted or wedged in the container. This feature is of considerable importance, as the charcoal is thus kept in proper condition for its best filtering and water purifying action. Furthermore, the construction whereby the water is diffused around the entire diameter of the filtering container furnishes a slow flowing space or lake-like recess in which the flow of water is checked, so as to permit the sediment to settle in the bottom and accumulate in the annular pocket 38, as all the water is held in the spaces 36 and 37 until it flows over the top of the charcoal container. This affords a relatively large area, due to the circumference of the spaces 36 and 37 and the height of the walls 17 of the container. The wire screen 37 further serves to check water flow therethrough and to afford an additional filtering means. The felt screen 21 and its wire screen backing 20 further serve to filter the water before its actually reaches the final purifying material, usually charcoal in the container, thus aiding in keeping the charcoal itself free from being coated with the sediment and impurities, and greatly prolonging its time of use, while maintaining it in best purifying condition.

My improved filter as above explained, is applicable to any ordinary water faucet, as illustrated in Fig. 2, but I prefer to use same with my novel form of valve and the additional water purification means shown in Fig. 1.

I find it convenient to position the boss 62 on the member 40 in a direct vertical line with the port 46, and therefore the same may serve as a visual guide to show when the valve is turned off or on to either nozzle. No separate handle or the like is necessary in this valve, as it is most convenient for the operator to simply manipulate the valve by swinging the same, using either the nozzle 48 or the filter, whichever it is desired shall be employed, as the means to open or close the valve. By having the boss 62 and consequently the fixed port 46 directly in front of the pipe, a user naturally would swing the free nozzle 48 in front to register therewith and to draw water therefrom, if this was desired. Or if filtered water was desired, the user would naturally swing the filter and nozzle into the front position and in line with the boss 62 and port 46. These features are of special value in practice and in household uses. Furthermore the fact that the same amount of clearance is obtained for a pitcher, receptacle, or the like under each faucet is of special value in ordinary domestic uses.

Having described my invention, what I claim as new and desire to secure by Letters Patent:

1. Filtering apparatus, comprising a holder for charcoal or the like, having means permitting a water flow therethrough, a removable metallic screening member surrounding a portion of said holder, an inclosing casing forming a sediment collecting pocket in the flow of water in advance of said screen, and means on said screen to remove sediment from said pocket.

2. Filtering apparatus of the kind described, comprising a cylindrical holder for charcoal or the like, having a water inlet and outlet therethrough, said holder having a reduced diameter in the upper portion, a removable cylindrical screening member surrounding said reduced portion, with the screen portion spaced from the holder to permit a flow of water horizontally through said screen, a textile filtering covering supported by the holder over said charcoal or the like, and a removable spring including a handle-like portion to hold said textile cover in position.

3. Filtering apparatus of the kind described, comprising an inclosing casing, having a removable base, said base including a cylindrical upstanding guard, a cylindrical holder adapted to fit snugly within said guard, the upper portion of said holder being of reduced diameter to provide a space from said guard, a water screening member surrounding the upper portion of said holder and forming with the top of the guard a sediment receiving pocket, the filtering devices being supported by and removable with said base.

In testimony whereof, I have signed my name to this specification in the presence of two subscribing witnesses.

JOSEPH D. RAMSEY.

Witnesses:
 JAMES R. HODDER,
 R. G. HERSEY.

Copies of this patent may be obtained for five cents each, by addressing the "Commissioner of Patents, Washington, D. C."